June 3, 1947.  W. H. EVANS  2,421,490
METAL REMOVING TOOL
Filed Aug. 2, 1943  4 Sheets-Sheet 1

INVENTOR.
William H. Evans

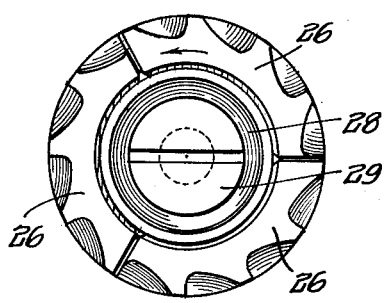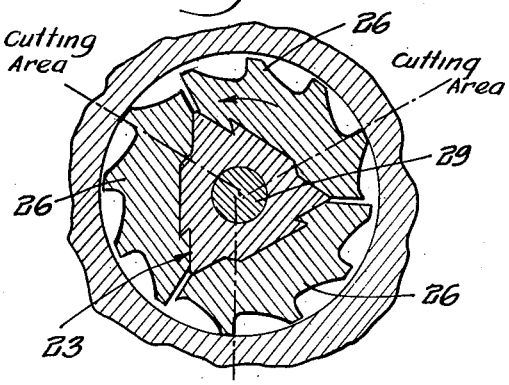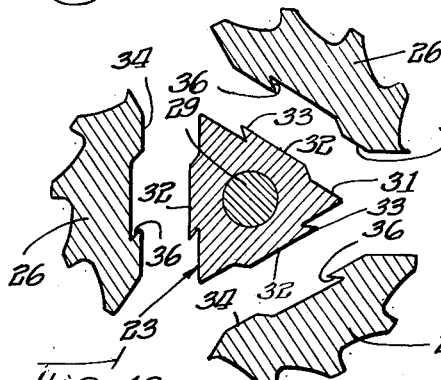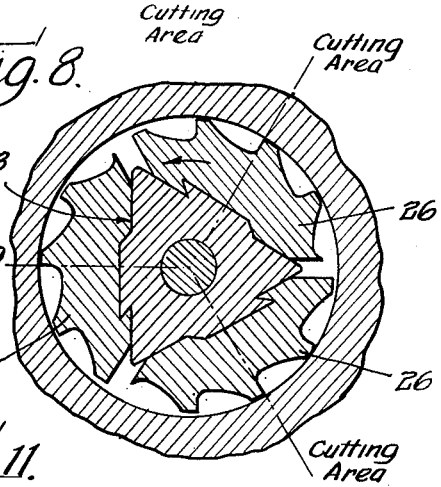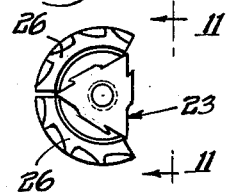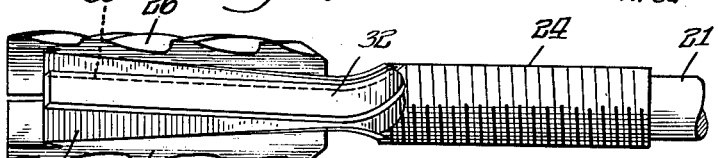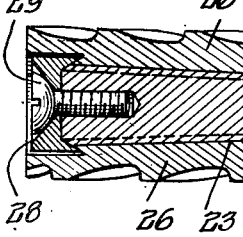

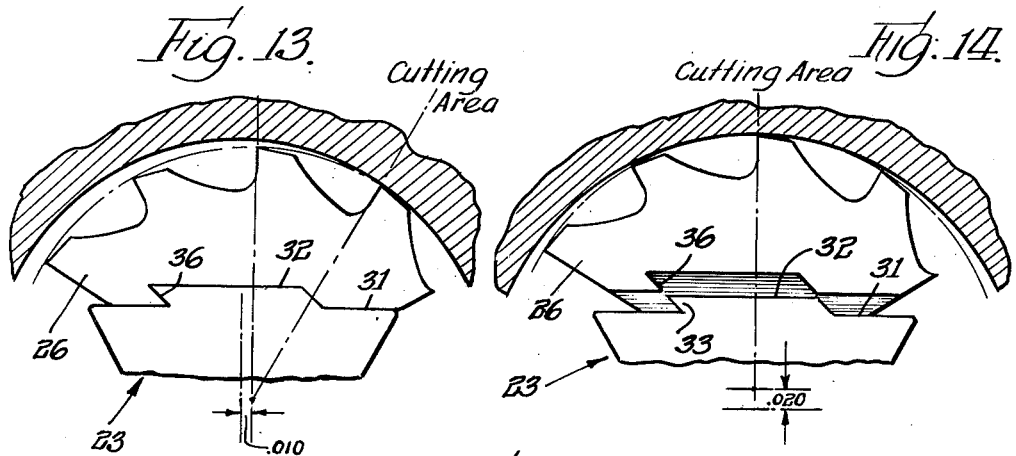
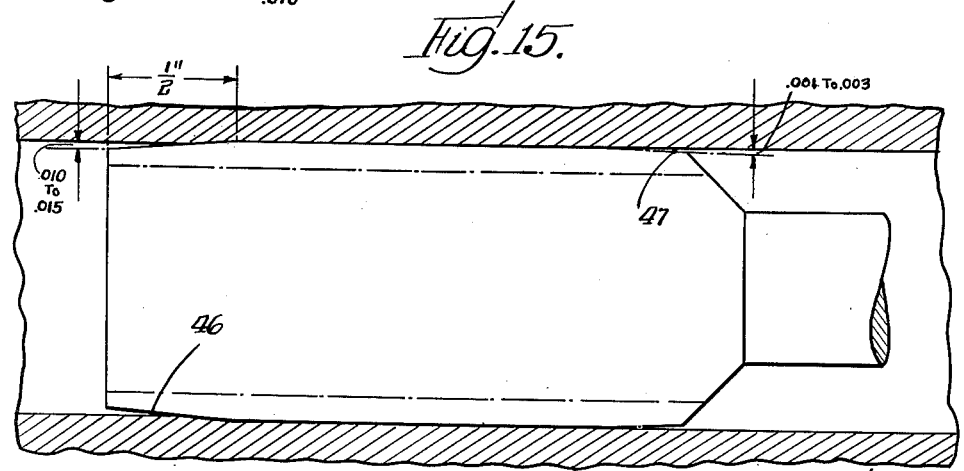
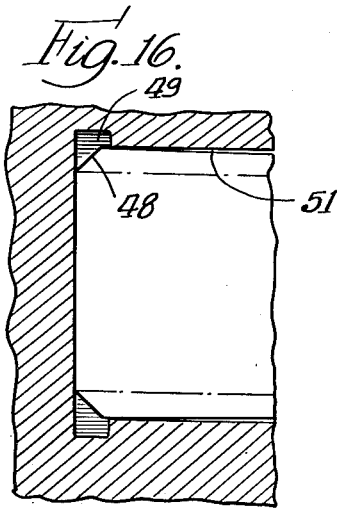
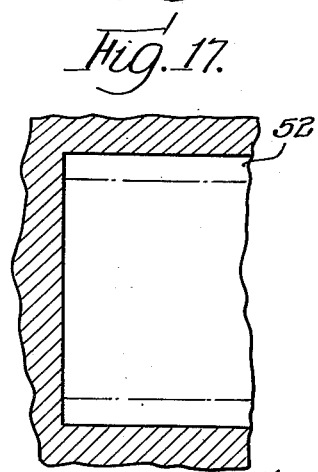
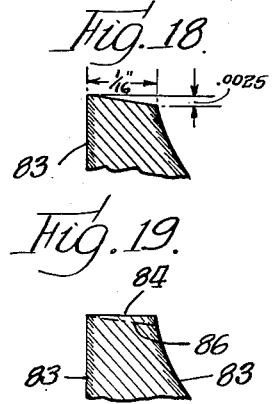
INVENTOR.
William H. Evans June 3, 1947.  W. H. EVANS  2,421,490
METAL REMOVING TOOL
Filed Aug. 2, 1943  4 Sheets-Sheet 4
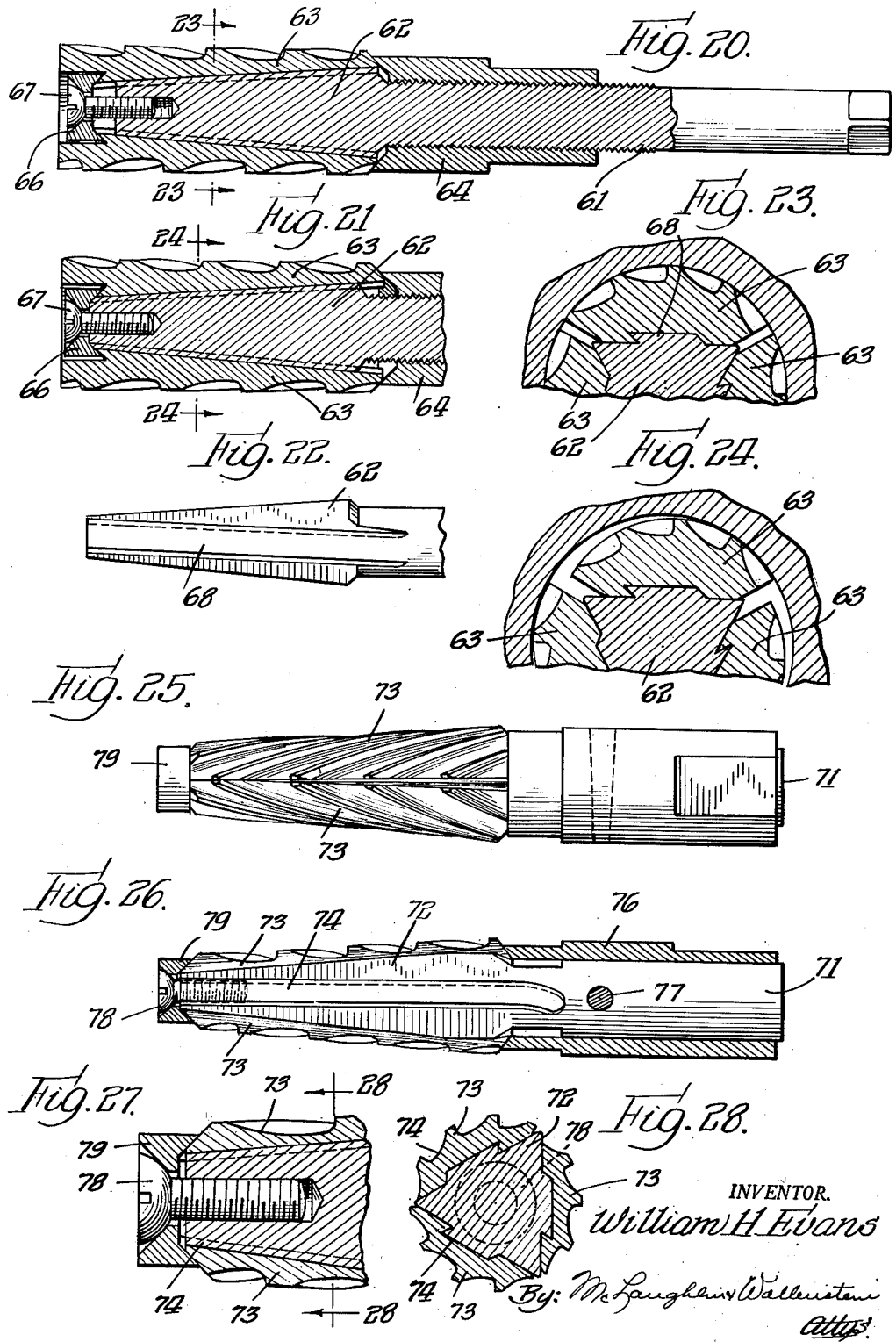

Patented June 3, 1947

2,421,490

UNITED STATES PATENT OFFICE 2,421,490

METAL REMOVING TOOL

William H. Evans, Chicago, Ill.

Application August 2, 1943, Serial No. 497,035

7 Claims. (Cl. 77—75.5)

My invention relates in general to metal removing tools such as expansion reamers, and more in particular to an embodiment thereof wherein the metal removing segments are at the end of the tool.

The principal object of my invention is the provision of an improved metal removing tool.

Another object is the provision of an expansion reamer particularly adapted for finishing drilled holes to close tolerances.

Still another object is the provision of an expansion reamer which will not chatter or dig into the work and which, therefore, may be used in actual operations to produce a smooth finished surface.

Other specific objects and features of the invention will be apparent from a consideration of the following detailed description taken with the accompanying drawings wherein—

Fig. 6 is an enlarged end view looking at the left hand side of the reamer shown in Fig. 1;

Fig. 7 is a sectional view taken on the line 7—7 of Fig. 2, looking in the direction of the arrows, the figure, however, including a portion of the work in order to illustrate the cutting action;

Fig. 8 is a sectional view taken on the line 8—8 of Fig. 3, looking in the direction of the arrows, the figure, however, including a portion of the work in order to illustrate the cutting action;

Fig. 9 is a sectional view similar to Fig. 7 but with the reamer removed from the work and the parts expanded and separated from each other in order more clearly to show some of the structural features;

Fig. 10 is an end view with one of the cutting segments and a portion of the segment securing and adjusting mechanism removed;

Fig. 11 is a fragmentary elevational view, the figure being taken from the right hand side of Fig. 10, substantially along the line 11—11 thereof;

Fig. 12 is a longitudinal sectional view partly in elevation but showing a modification wherein a spring is employed to support the cutting segments resiliently at one end thereof;

Fig. 13 is a schematic view illustrating the position of the cutting segments with respect to a center line, parallel to the radius of a circle, the center of which coincides with the center of the reamer mandrel;

Fig. 14 is a view similar to Fig. 13 but showing a different setting of the reamer blades than Fig. 13;

Figure 1:
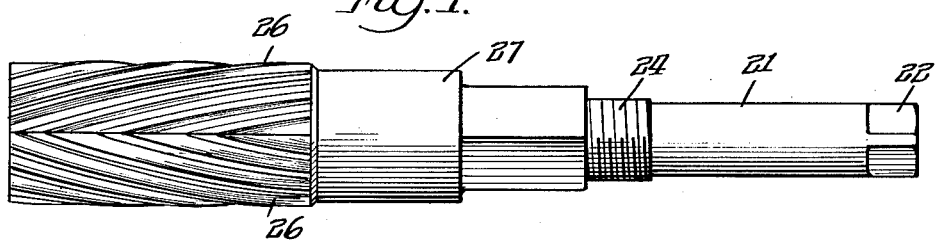
Fig. 1 is an elevational view showing one embodiment of the principles of my invention.

Figs. 15 to 17, inclusive, are schematic views illustrating certain relations which may be maintained between portions of the cutting surfaces and the work, depending upon the character of the work and the results desired;

Figs. 18 and 19 illustrate the manner of finishing the cutting surfaces and the wear thereof when a reamer produced in accordance with my invention is employed;

Fig. 20 is a longitudinal sectional view, partly in elevation, showing still another embodiment of the invention;

Fig. 21 is a fragmentary sectional view showing the parts in a different adjusted position than Fig. 20;

Fig. 22 is a fragmentary elevational view of a portion of the mandrel;

Fig. 23 is a sectional view taken on the line 23—23 of Fig. 20;

Fig. 24 is a sectional view taken on the line 24—24 of Fig. 20;

Fig. 25 is an elevational view showing a still further embodiment, wherein the reamer is constructed in such a manner as to produce a tapered surface;

Fig. 26 is a longitudinal sectional view partly in elevation, showing some of the details of construction of the mandrel of Fig. 25;

Fig. 27 is an enlarged fragmentary longitudinal axial sectional view showing structural details of Fig. 25; and Fig. 28 is a transverse sectional view taken on the line 28—28 of Fig. 27.

In accordance with the general features of my invention, I employ a plurality of cutting segments together comprising substantially 360 degrees of cutting area. These cutting segments are provided with metal removing means, preferably spiral flutes and lands, the lands being finished to form cutting edges and the direction of the spiralling on the cutting segments being, at least in part, reversed so that some of the cutting surfaces cut across the tool marks of other cutting surfaces. The cutting segments are preferably three in number to make the reamer self-centering and its parts self-adjusting. The cutting segments are mounted on a mandrel, and are driven by the latter by means of a hook-like formation in the nature of a driving connection between the mandrel and segments. This hook-like connection, in the case of the segments, is located near that edge of the segments which is leading with respect to a reaming operation. The said hook-like connection, which also serves to support the segments, and broadly may also be termed a hook-like support, is so constructed and arranged that the said leading edge of the segments will have a tendency to be forced inwardly or towards the axis of the mandrel. As will be explained later, the end of the segments are finished so as to favor such movement of the segments. The hook-like arrangement utilized for the above purposes, preferably comprises a V slot and a complementary V projection which co-act to produce a camming action. One of such V's is carried by the segments and the other of such V's is carried by the mandrel, the choice of which V is carried by the segments being non-critical and a preferred choice being hereinafter indicated and the V's themselves being hereinafter described in detail.

The cutting segment supporting surfaces proper of the mandrel, the hook-like formations being auxiliary thereto as far as segment supporting is concerned, are inclined to the mandrel axis in a manner generally similar to that of the blade supporting surfaces of conventional expanding reamers wherein the cutting blades slide along such surfaces for adjusting the reamer. The lower surface of the cutting segment may be appropriately inclined so that movement of the segments longitudinally to expand or contract the cutting surfaces, depending upon the direction of movement, will not have the effect of changing the parallelism of the outer surfaces thereof with respect to the axis. The edge or apex of the V of the mandrel's hook-like combination drive and segment support, and the segment supporting surface proper of the mandrel slant sidewise of the axis so that such edge, which in reality is a straight line, although parallel to the segment supporting surface proper of the mandrel, if extended would not intersect the axis. As a result of this non-parallel and non-intersecting relationship between such edge and the axis, the segments move bodily across the axis or shift sidewise while also expanding or contracting. Thus, at different stages of expansion of the cutting segments there is a different area of the segment doing the cutting. Cutting at all times occurs behind the hook-like connection (the term "behind" being used with respect to the direction of rotation of the reamer) and in the particular embodiment shown, the cutting area will vary between approximately a position centrally of the cutting segments to a point near the trailing edge thereof.

The cutting segments may be supported at their ends by adjustable means whereby they may be carried at different positions longitudinally of the mandrel. The segment supporting means must at all times have a smaller diameter than the effective diameter of the cutting portion of the reamer and in an end reamer, such as shown in some of the figures, may engage in end recesses of the cutting segments so as not to project longitudinally therefrom.

Additional features and details of the invention will be discussed in connection with and after the description of the specific embodiments shown. In describing the specific embodiments, I shall first refer to Figs 1 to 11, inclusive.

The reamer may comprise a solid mandrel 21 shaped at 22 to receive any kind of a suitable tool, such as the chuck of a reamer driving device. The mandrel also comprises a segment supporting area, indicated generally by the reference character 23, and a threaded portion 24. A plurality of cutting segments 26 are exteriorly beveled at one end to be engaged by a beveled portion of an adjustable segment retainer 27. Preferably, the segments have cutting surfaces spiralled in opposite directions and, as indicated more particularly in Figs. 6 to 10, inclusive, there are suitably, and for some purposes preferably, three cutting segments, two of which may have left hand spirals and one of which has a right hand spiral. Ends of the cutting segments are interiorly beveled, that is they are undercut and recessed as shown particularly in Figs. 2, 3 and 5, to receive a collar retainer 28 forced into position by a machine screw 29 threaded into the tapped end of the mandrel. The retainer and bevelled ends of the segments preferably are finished to cause the two V's of the hook-like connection to wedge against each other, as will be explained later.

Figure 4:
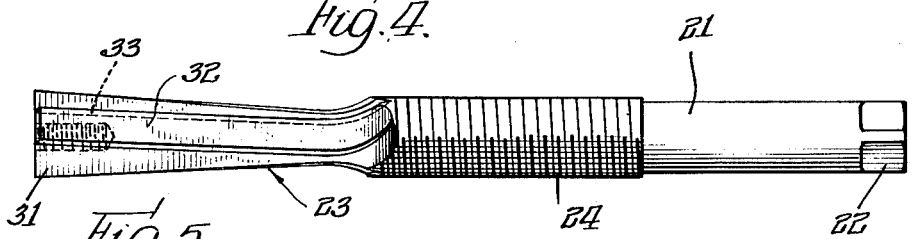
Fig. 4 is a plan view of the mandrel with all of the associated parts removed therefrom.
Figure 5:
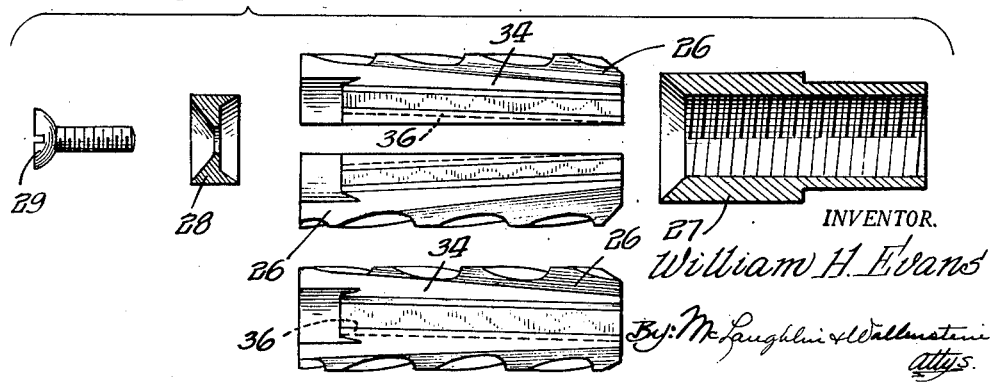
Fig. 5 is an expanded sectional view of the parts other than the mandrel, the parts being sectioned along the same line as the parts shown in Figs. 2 and 3, but with portions of the parts being shown in elevation in order more clearly to bring out the construction.

In order to prevent the cutting segments from shifting circumferentially with respect to the mandrel, and to secure other advantages, I provide an improved supporting arrangement on the mandrel which may be particularly brought out by reference to Figs. 4, 5 and 9, although parts to be referred to also appear in some of the other figures. The mandrel has a tapered surface 31 on which is a raised portion 32, undercut at one side to provide a hook-like connection 33. The underside of the cutting segments is also provided with a supporting surface 34, shaped generally to correspond to the supporting surface of the mandrel including the raised portion 32, but having a recess 36 for receiving the hook-like support 33 of the mandrel. As may be noted by reference to Fig. 4, the raised portion 32 and the hook-like support 33 extend for the full length of that portion of the mandrel which carries the cutting segments. As shown, by Fig. 4, also, the raised portion 32 is inclined to a chordal plane intersecting the axis of the reamer. By reference to the lowermost segment of Fig. 5, the lower surface of which appears in this figure, it will be seen that the configuration thereof is such as to correspond to that of the raised portion 32. Thus, as the cutting segment is advanced along the supporting surface 31, it shifts sidewise along the surface 31, in addition to expanding bodily away from the center of the reamer axis.

In the modified form of the device shown in Fig. 12, I employ a spring 37, one end of which engages a retainer 38 and the other of which is engaged by a spring retainer 39 threaded on the mandrel 21. The retainer 39 is shaped at 41 to receive a tool or chuck, it being noted that the mandrel is formed and threaded in such a way as to produce a shoulder for limiting the turning movement between the mandrel and the retainer 39. Thus, the reamer may be operated by grasping the member 41, and a pin or key may also be used between this member and the mandrel if desired. The remaining portions of Fig. 12 are similar to corresponding portions described by reference to figures; and, for convenience, the same reference characters have been applied thereto.

Before describing the additional embodiments of my invention shown in the drawings, I wish to point out certain details which I believe to be of importance in securing the best results, these details being generally applicable, however, to all embodiments.

The flutes and lands of the cutting segments may be formed in various ways, but suitably they may be cut on an eighteen inch lead, that is to say, equivalent to one thread in about eighteen lineal inches. This structural detail may be varied somewhat, particularly in different sizes but I have found that a pitch or lead of about eighteen inches will give good results and will be suitable for most purposes. I, moreover, believe that there is an advantage, if possible, in standardizing, particularly from the standpoint of sharpening the cutting surfaces in the manner referred to hereinbelow. It is to be understood, of course, that the cutting surfaces need not be cut on a regular curve, but various forms and inclinations may be used while still following other teachings of my invention.

A suitable width across the lands is about 1/16 of an inch in sizes of reamers running from about .750 inch to about 1.750 inch, but it may be advisable to modify this dimension below and above these sizes. From the leading or cutting edge of the land to the trailing edge of the land, there is a drop of about .0025 inch, although this dimension also may be modified and many of the advantages of my invention retained. The taper on the mandrel effective to expand the blades, and the slanting position of the raised portion 32 may vary but, in general, I have found it satisfactory to provide for about a .020 inch expansion of each reamer segment per ½ inch of longitudinal travel with a shift sidewise of the reamer blade during the corresponding movement of .010 inch. This provides for a total expansion of the reamer from the minimum to the maximum diameter of .040 inch and for many purposes, I believe this to be adequate. A total expansion of .075 inch to .100 inch is easily possible using the general design of the embodiment shown in the drawings, and by modifying the design still greater expansion may be obtained. Since the device of my invention, however, is primarily intended as a finishing reamer, extreme expansion is not required.

With the construction of the parts and the manner of supporting the reamer segments, such as illustrated, it is clear that there is at all times a dragging effect upon the reamer cutting segments, and a consideration of the forces involved will show that there is no possibility of causing a chattering action or a digging in of the cutting surfaces, and the reamer of my invention will produce a "mirror finish." Looking at Fig. 9, it will be seen that while there will be a tendency to lift the front portion of the cutting segment away from the mandrel, the hook-like support 33 prevents such pulling away and, indeed, since there is a tendency also for the reamer cutting segments to shift bodily with respect to the mandrel (looking at Fig. 9, the movement is in a clockwise direction if the movement in cutting is as indicated by the arrows), the corresponding slanting surfaces of the hook-like connections 33 and recesses 36 pull the front end of the cutting segments toward the supporting surfaces 31. There is a tendency of that portion of the segment immediately in advance of the hook-like connection to lift slightly, but this is overcome not only by the action of the cam surfaces but by the fact that the segments are finished so as to have the leading portion thereof engaged by the collar retainer. With only reasonably accurate machine work, however, the parts may be finished so that the degree of separation of the surfaces at the point noted will not be more than a fraction of .001 inch. As will be seen, however, any possible separation of the parts at this point, if small, is of no significance.

If the cutting area is in back of the point of connection of the cutting segment (or behind the apex of the V of the segment) so that there is a dragging action, the portions of the surfaces in back of the hook-like connection 33 are brought closer together by the very action of engaging the work with the metal removing surfaces. If, due to expansion, the cutting surface in back of the central portion of the cutting segment surface has a diameter sufficiently in excess of that of the forward portion of the cutting segment so that, even after the cutting segment has lifted slightly at the front portion, the portion of the cutting segment in back of center is still the highest and will maintain itself in engagement with the work, then an equilibrium condition is established such that, with a greater cutting load, the cutting segments will merely be forced more tightly against the mandrel and the possibility of a lifting action such as might permit chattering or digging in is absolutely prevented.

There are various constructions which may be employed in accordance with my invention to bring about the desired result. As shown particularly in Figs. 7 and 8 (and also as may be noted by reference to Fig. 4), the slanting position of the raised portion 32 is such that, at all positions other than that of maximum expansion, the cutting action will be in back of a center line drawn midway between the leading and trailing edges of the cutting segments, but only a maximum expansion does cutting take place at the center line. The direction of slanting, of course, may be reversed so that at the minimum possible diameter, the cutting takes place at the center line and the cutting at all expanded positions takes place in back of the said center line. The construction shown in the drawings has a certain advantage, however, in that at no time is a condition reached wherein the entire cutting area is in engagement with the work such as could occur if the cutting took place along the said center line and the minimum diameter to which the reamer could be adjusted corresponded to the radius of curvature of the reamer segments themselves.

In order to illustrate the manner of controlling the cutting area, and the advantages thereof, I have shown two partially schematic views, one as indicated, with the reamer fully expanded and the other with the reamer fully contracted. In the fully contracted position, the reamer segment has shifted sidewise the indicated .010 inch so that the cutting occurs along the line indicated generally by the caption "cutting area." At the fully expanded position, the cutting segment has been shifted outwardly .020 inch, and the cutting segment has shifted .010 inch sidewise with the result that the cutting area is approximately along a line midway between the leading and trailing edges. Even with this adjustment, the cutting is still well in back of the apex of the hook-like drive formation of the segment and the cutting segment will be held tightly against the mandrel. A shift of only a few thousandths of an inch can and does, of course, cause a shift of a major proportion around the arcuate dimension of the cutting segment from, for example, the center to the trailing edge thereof. Actually, an expansion reamer will very seldom be employed at its absolute maximum expansion so that for all practical purposes it might be said that cutting occurs at all times in back of the cutting segment center line.

There may be some slight variation in the uniformity of the diameter of the reamer; that is to say, the portion defining the cutting areas may be absolutely cylindrical, may be barrel shaped or tapered, or it may have other modified shapes, depending upon the work being performed. As illustrated in Fig. 15, I may taper the cutting surfaces slightly as shown at 46 at that portion thereof which first enters the hole to be reamed. I have found, as indicated on the drawings, that a taper of .010 to 0.15 of an inch in ½ inch running longitudinally of the reamer is suitable for the purpose. This allows the reamer to enter the work and pick up the load gradually. The last portion of the reamer to enter the work may be, with some advantage, relieved about .001 to .003 inch as indicated at 47. Generally speaking, the tapers indicated in Fig. 15 or some modification thereof, are suitable for employment when the reamer can pass entirely through the opening being reamed. When, however, it is necessary to ream a blind hole, a taper of this kind, generally speaking, is not satisfactory.

One feature which may be employed is shown in Fig. 16 wherein there is a relatively sharp lead as shown at 48, and the cutting load is picked up quickly. This, like some of the other showings, is somewhat exaggerated in order to bring out the point. This sort of construction is particularly suitable when an undercut, such as shown at 49, may be used. There may be a slight taper also, as shown at 51 when a relatively sharp lead such as shown at 48 is used. When a slight taper, such as indicated at 51, is employed, any remaining portion of the reamer may be held to maximum diameter, this depending somewhat upon the material on which the work is being performed and other factors as those skilled in the art will understand.

As indicated in Fig. 17, the reamer blade 52 may be made of substantially uniform diameter so that the blind hole being reamed will be finished as near a uniform diameter throughout as careful reamer construction and operation will permit. Generally speaking, when a reamer is finished in the manner indicated in Fig. 17, several finishing cuts may be necessary and the metal removed at any one time may be very slight.

The manner of adjusting the reamer of my invention will be modified depending upon the exact cutting segment supporting means employed. When employing a construction such as shown in Figs. 1 to 11, inclusive, the reamer may be expanded by withdrawing the screw 29 to approximately the position desired, turning the retainer 27 to the new setting and then tightening up the machine screw 29 to grasp the cutting segments firmly in the new position. When a spring, such as shown in Fig. 12, is employed, it is only necessary that the screw 29 alone be adjusted enough tension being retained in the spring 37 to force the cutting segments to the expanded position. The reamer of my invention may be made so free cutting that even though the cutting segments may be forced to a contracted position against the compression of spring 37, the segments will, nevertheless, retain their position even though a relatively heavy cut may be taken. If there should be some slight contraction of the reamer cutting segments, the reamer may be run through the second time with the result that a final thin cut will be taken and a smooth finish obtained.

Before referring in greater detail to features of the reamer of my invention, I wish to describe the remaining embodiments, and I shall first direct my attention to Figs. 20 to 24, inclusive.

The reamer mandrel 61 has a tapered segment supporting section 62, carrying segments 63, preferably three in number, as indicated. At one end the segments are supported by retainer 64 and at the opposite end by a retainer 66, held in position by a machine screw 67 threaded into the centrally tapped end of the mandrel. The segment supporting means of this embodiment is identical with that shown in the previously described embodiments, with the exception that the raised portion 68, similar to the previously described raised portion 32 slants in such a direction that the shifting of the reamer segments sidewise is in the opposite direction. The taper of the portion 62 is also in the opposite direction to the taper of the portion 23 illustrated in Fig. 4. In other respects, the hook-like connection and other features are substantially the same.

Figure 2:
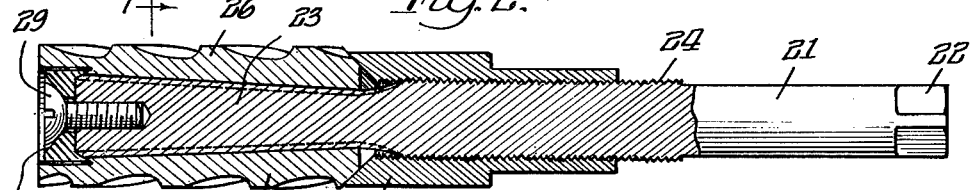
Fig. 2 is a longitudinal sectional view taken through the reamer of Fig. 1, but showing the cutting blades or segments in contracted position.
Figure 3:
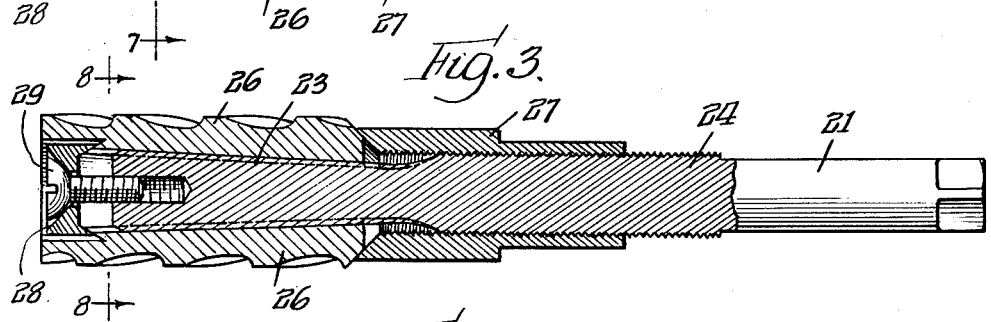
Fig. 3 is a longitudinal sectional view similar to Fig. 2 but showing the cutting blades or segments in expanded position.

When the reamer is in contracted position, as shown in Figs. 20 and 23, the distinctions between the form of invention shown in these figures and that shown in the corresponding Figures 2 and 6 of the previously described embodiment may be observed. In this adjusted position, as indicated in Fig. 23, the cutting area is midway between the leading and trailing edges of the segments. There is a space between the end of the mandrel and the retainer 66, and this space is indicative of the extent to which the cutting segments may be moved along the supporting surfaces of the mandrel in a direction to expand them. As soon as there is any shifting of the segments in a direction to expand them, there is also an immediate shifting of the segments bodily laterally. At fully expanded position, the parts are substantially in the position shown in Figs. 21 and 24 and it will be noted here that cutting takes place near the trailing edge of the cutting segments.

The reamer shown in Figs. 25 to 28 is intended for finishing tapered openings of any kind where needed, such as in valve bodies of the plug valve type. In this form, the mandrel 71 is relatively short and has a tapered portion 72 for receiving a plurality of cutting segments 73. The portion 72 includes, as part of the segment supporting exterior, a plurality of raised portions 74 shaped to provide hook-like connections for the cutting segments. In the form of device shown, the cutting segments are spiralled, one having spirals in one direction and two having spirals running in the opposite direction. The cutting surfaces are so finished as to cut on an angle to the axis of the reamer, the inclination being such as to form a taper of so many inches per foot, as may be desired.

The cutting segments may be adjustable in a device of this character but I show a retainer 76 at one end pinned to the mandrel by means of a pin 77 so as to be non-adjustable. The opposite end of the mandrel is interiorly threaded to receive a machine screw 78 and this engages a retaining collar 79 to hold the segments in position. A reamer of this type is not required to be expansible, as a rule, because it is simply necessary to continue a reaming operation, if the tapered opening being reamed is to be slightly enlarged; in other words, advancing the reamer is the equivalent of expanding it so far as a tapered opening is concerned. In this form of device, the cutting segments are finished so as to cut slightly in back of center, or, in any case, always in back of the hook-like support for the segments, this expression "in back of" being used to designate direction, having in mind the direction of rotation of the reamer during a reaming operation.

Using the features of my invention, it is possible to employ for the cutting segments, high speed tool steel such, for example, as the high molybdenum tool steel known in the trade as Latrob Double Six tool steel, and it may be hardened to substantially maximum hardness. As an alternative or as an additional procedure to maximum hardening of the tool steel used, the segments may be case hardened by any suitable means which will produce a very thin case hardened surface such as shown at 83 in Figs. 18 and 19. Any suitable case hardening method may be employed in producing this hardened surface, such as the process known in the steel industry as "Holden Hi-Case." Notwithstanding the fact that such a hard cutting edge is produced, I find that the edge will not flake off but will remain sharp until the top surface is substantially flat as indicated at 84 in Fig. 19. This is a wearing away of approximately .0025 inch when the segment had been sharpened in the manner indicated in Fig. 18. The reamer can again be sharpened by simply grinding to the contour indicated by the dotted line 86 of Fig. 19. This action may be contrasted with that of usual reamers with which I am acquainted wherein the cutting edge, instead of remaining sharp becomes rounded. This is due to a rocking motion which takes place in most of the reamer cutting blades of the prior art.

The cutting segments are also preferably coated with a very thin coating of a hard heavy metal, such as chromium, iridium or the like, which is more noble than iron. I have found that when the cutting segments are provided with a very thin coating of chromium, there is little or no tendency for particles of metal to adhere to the cutting edges and cause an improper finish. If a reamer, not provided with a protective coating as described, is used to ream aluminum and bronze, for example, very small particles of aluminum will adhere to the cutting edges and later cut very fine score lines in the bronze. Using my invention as described, this problem is avoided and a mirror-like finish is obtained. The order of steps is first to finish the segments, harden the metal thereof, then case harden them to produce a very thin but hard case, afterwards chromium plate, and finally sharpen in the manner indicated in Figs. 18 and 19.

There are certain advantages to be secured from the use of three segments, mounted and supported in the manner shown. In addition to being self-centering on the mandrel and in a hole during a reaming operation, they automatically adjust themselves to be supported by a relatively loose retaining member, such as a swivellable collar or the like.

I have previously referred to the fact that the parts are finished in such a manner as to cause a wedging action at the connection between the segments and mandrel. My construction permits my obtaining this effect in various ways but generally I finish the retainer to be uniform but swivellable, but finish the bevelled portion of the segments to be non-uniform. A preferred method of producing this result is as follows.

When the internal bevel engaged by the retainer 28 (Figs. 2, 3 and 5) has been milled, and before the segment has been hardened, the segment is rocked slightly while holding the milling cutter in position, to remove a few thousandths of an inch of the bevelled surface in back of center, so that a high point is left about in line with, or even ahead of, the V slot 36. The segment is then completed, and as one of the last operations the outer bevelled surface is ground to finish it. This operation may be carried out by engaging the grinder against the bevelled surface while rocking it back and forth from leading to trailing edge. As a final operation, a few thousandths of an inch of metal are ground from all except the forward portion of the bevel about in line with the V slot 36. This is done by advancing the grinding wheel, but rocking the segment from the trailing edge to a point not quite up to the leading edge. Grinding the exterior bevel last makes it possible to make up for any slight warpage which may occur during a hardening operation.

While the segment supporting surfaces of the mandrel may take various forms, I find an advantage in these surfaces being flat, at an angle to the axis, and uniformly spaced around the periphery of the mandrel. The raised portion or continuous projection on the said surfaces and the coacting socket of the metal removing segments, as well as the V slot of the mandrel, run at an angle to a chordal plane, or while generally parallel to the plane of said flat surfaces, they extend in such a direction that if continued they would not intersect the mandrel axis. When the metal removing tool comprises a so-called end reamer, or is intended for the purpose of removing metal from the walls of an opening substantially to the bottom of such opening, the inclined segment supporting surfaces terminate substantially at one end of the mandrel and the supporting means for the segments may then comprise, in addition to an external retainer, means extending outwardly from the end of the mandrel for supporting and moving the segments. At least one metal removing segment will then be required to extend longitudinally beyond the last mentioned mandrel supporting means.

The several features discussed hereinabove may be employed in various ways and in many structural embodiments and, of course, it is to be understood that all of the features and details discussed need not be employed. My invention, therefore, is not limited to the specific details described and shown but is defined in the claims.

What I claim as new and desire to protect by Letters Patent of the United States is:

1. In an expansion reamer, a mandrel having tapered segment supporting surfaces, each such supporting surface having a V-shaped projection located near an edge of the surface which is leading with respect to the direction of rotation of the reamer during a reaming operation, cutting segments with spiral cutting edges adapted to be supported on the tapered surfaces, each cutting segment having a V-shaped slot near its edge which is leading with respect to the direction of rotation of the reamer for engaging over the hook-like projection on the tapered surface, whereby to provide hook-like surface to surface connections between the segments and mandrel having the effect of drawing the segments tightly against the mandrel during a reaming operation, an external retainer, an internal retainer, and means for supporting said retainers on the mandrel, said retainers and segments having mutually engaging bevelled surfaces.

2. A metal removing tool comprising a mandrel, a metal removing segment the inner surface of which rests against the surface of said mandrel, said surfaces being flat and disposed at an angle to the axis of the mandrel for moving said segment outwardly of the axis as said surfaces slide upon each other, one of said surfaces having extending therefrom a hook-like projection and the other of said surfaces having depressed therefrom a hook-like depression, said projection and depression being in the form of a V and coacting to drive said segment in a metal removing direction and to urge said surfaces toward each other, and means for sliding said surfaces upon each other and for maintaining said segment axially, the outer surface of said segment presenting a plurality of metal removing edges.

3. A metal removing tool comprising a mandrel, a metal removing segment the inner surface of which rests against the surface of said mandrel, said surfaces being flat and disposed at an angle to the axis of the mandrel, one of said surfaces having extending therefrom a hook-like projection elongated along a line which is parallel to such one surface but which if extended would not intersect said axis, the other of said surfaces having a complementary hook-like depression for driving said segment, the outer surface of said segment presenting a plurality of metal removing teeth, and means for shifting and for retaining said segments axially of said mandrel whereby the portion of said teeth which is furthest from said axis changes as said segment is shifted.

4. An expansion reamer comprising a mandrel and three radially disposed cutting segments substantially filling the periphery of the reamer, said mandrel and segments having flat inter-engaging axially tapered surfaces to permit adjustment of the segments by longitudinal movement of the segments, said segments and mandrel having longitudinal hook-like inter-engaging portions along leading edges of the cutting segments for pulling the segments around by reaming rotation of the mandrel, and internal and external retaining means for the segments, the internal means being so positioned as to cause the segments to occupy an end of the mandrel and permit reaming substantially to the bottom of a blind hole, and said hook-like inter-engaging portions comprising a projection and depression in the form of a V coacting to drive the segments in a metal removing direction and to urge said surfaces toward each other.

5. In an expansion reamer, a mandrel having tapering segment supporting surfaces, a hook-like projection near the forward edge of each surface tangential to the reamer axis support, cutting segments with spiral cutting edges, having bottom surfaces corresponding to the tapered surfaces on the mandrel and each having a slot near the forward edge thereof into which said hook-like projection on the mandrel extends, to form a hook-like connection between the cutting segments and mandrel, said hook-like connection as to each segment being located near that edge thereof which is leading with respect to the reaming direction of rotation of the reamer, whereby pressure applied to the spiral cutting edges during a reaming operation will have the effect of drawing the segments tighter against the tapered surface of the mandrel, and means including internal and external retainers for supporting said segments at one end of the mandrel, said mutually engaging surfaces between the segments and mandrel being substantially flat, and said hook-like connections forming a V in which substantially a surface to surface contact exists between one leg of each V.

6. In an expansion reamer, a mandrel having a plurality of flat tapering segment supporting surfaces, a hook-like projection near the forward edge of each such flat surface tangential to the reamer axis support, three cutting segments with spiral cutting edges, having bottom surfaces corresponding to the tapered surfaces on the mandrel and each having a slot near the forward edge thereof into which said hook-like projection on the mandrel extends, to form a V-shaped connection between the cutting segments and mandrel in which the connection is between two surfaces, said hook-like connection as to each segment being located near that edge thereof which is leading with respect to the reaming direction of rotation of the reamer, whereby pressure applied to the spiral cutting edges during a reaming operation will have the effect of drawing the segments tighter against the tapered surface of the mandrel, and means including internal and external retainers for supporting said segments at one end of the mandrel, the said three segments having the effect of centering the reamer.

7. A metal removing tool comprising a mandrel, a metal removing segment the inner surface of which rests against the surface of said mandrel, said surfaces being flat and disposed at an angle to the axis of the mandrel for moving said segment outwardly of the axis as said surfaces slide upon each other, one of said surfaces having extending therefrom a hook-like projection and the other of said surfaces having depressed therefrom a hook-like depression, said projection and depression being in the form of a V and coacting to drive said segment in a metal removing direction and to urge said surfaces toward each other, and means for sliding said surfaces upon each other and for maintaining said segment axially, the outer surfaces of said segment presenting a plurality of metal removing edges, said last mentioned means including an internal retainer and being so constructed and arranged as to cause said segments to occupy one extreme end of the mandrel, whereby to permit reaming a blind hole substantially to the bottom thereof.

WILLIAM H. EVANS.

REFERENCES CITED

The following references are of record in the file of this patent:

UNITED STATES PATENTS

| Number | Name | Date |
|---|---|---|
| 1,479,079 | Kutchera | Jan. 1, 1924 |
| 1,902,062 | Evans | Mar. 21, 1933 |
| 1,989,476 | Evans | Jan. 29, 1935 |
| 1,538,028 | Davis | May 19, 1925 |
| 1,590,184 | Emmons | June 29, 1926 |
| 2,132,373 | Bartholomew | Oct. 4, 1938 |

(Other references on following page)

UNITED STATES PATENTS

| Number | Name | Date |
|---|---|---|
| 972,139 | York et al. | Oct. 4, 1910 |
| 2,138,727 | Cogsdill | Nov. 29, 1938 |
| 2,145,370 | Pohlman | Jan. 31, 1939 |

FOREIGN PATENTS

| Number | Country | Date |
|---|---|---|
| 65,457 | Germany | Nov. 10, 1892 |

OTHER REFERENCES

Machinery, May 1934, pages 536 and 537, "Chromium Plating Increases the Life of Tools and Dies in Automotive Plants," by Charles O. Herb.

Mechanical Engineering, vol. 50, No. 12, Dec. 1928, pages 927-30, "Mechanical Applications of Chromium Plating," by W. Blum.